United States Patent [19]
Morii et al.

[11] Patent Number: 5,679,314
[45] Date of Patent: Oct. 21, 1997

[54] METHOD FOR RECOVERING AMMONIA ADSORBENT

[75] Inventors: Atsushi Morii; Satoru Serizawa; Osamu Naito; Toshiyuki Onishi, all of Nagasaki; Kouzo Iida, Hiroshima, all of Japan

[73] Assignee: Mitsubishi Jukogyo Kabushiki Kaisha, Tokyo, Japan

[21] Appl. No.: 500,234

[22] Filed: Jul. 10, 1995

Related U.S. Application Data

[63] Continuation of Ser. No. 127,551, Sep. 28, 1993, abandoned.

[30]  Foreign Application Priority Data

Sep. 28, 1992  [JP]  Japan ................... 4-258054

[51] Int. Cl.⁶ ........................................... C01C 3/00
[52] U.S. Cl. .................................. 423/237; 423/239.1
[58] Field of Search ........................ 423/237, 239.1

[56]  References Cited

U.S. PATENT DOCUMENTS 5,219,544   6/1993   Kupper et al. ..................... 423/237

FOREIGN PATENT DOCUMENTS

| 35 26 756 | 1/1987 | Germany. |
| 41 10 333 | 9/1991 | Germany. |
| 354110971A | 8/1979 | Japan. |
| 55-23069 | 2/1980 | Japan. |
| 58-186421 | 1/1984 | Japan. |
| 2026618 | 1/1990 | Japan. |
| 3207430 | 9/1991 | Japan. |

*Primary Examiner*—Deborah Jones
*Assistant Examiner*—Amy Harding
*Attorney, Agent, or Firm*—Jacobson, Price, Holman & Stern, PLLC

[57]  ABSTRACT

A method for recovering an ammonia adsorbent which comprises streaming an $NO_x$-containing gas at 300°–600° C. through an ammonia adsorbent layer which adsorbs ammonia and which is saturated with ammonia.

9 Claims, 1 Drawing Sheet

METHOD FOR RECOVERING AMMONIA ADSORBENT

This is a Continuation of application Ser. No. 08/127,551, filed Sep. 28, 1993 which was abandoned upon the filing hereof.

FIELD OF THE INVENTION AND RELATED ART STATEMENT

The present invention relates to a method for recovering an ammonia adsorbent. In particularly, the present invention relates to a method for recovering an ammonia adsorbent disposed on the downstream side of a dry exhaust gas denitrating device using ammonia as a reducing agent. This ammonia adsorbent is preferably disposed in a temperature region of 200° C. or less on the above-mentioned downstream side. In the present invention, this adsorbent is recovered, when the ammonia adsorbent adsorbs remaining ammonia in the above-mentioned dry exhaust gas denitrating device and it is saturated with ammonia.

Ammonia remaining in the exhaust gas from the dry exhaust gas denitrating device utilizing ammonia as a reducing agent is adsorbed by the adsorbent, but the amount of adsorbed ammonia is limited and therefore in order to use the adsorbent repeatedly, a suitable adsorbent recovery treatment is necessary. As an adsorbent recovery means, there have been known a method in which temperature is elevated for desorbing ammonia, and another method in which pressure is lowered to a level in the vicinity of vacuum so that ammonia can be desorbed.

However, for the sake of the adsorbent recovery by heat, a high-temperature gas or a heating device is necessary, and for the sake of the adsorbent recovery by vacuum, it is necessary to decrease the pressure by vacuum suction. Both methods have the drawback that a large amount of energy is consumed. In addition, a long period of time is required for the recovery. Since an adsorption process is not carried out during the recovery period, a capacity of the apparatus must be increased so as to overcome such an inconvenience. Particularly for the desorption of adsorbed components present in trace amounts, a degree of vacuum must be increased, so that a great deal of energy and a heating device or a vacuum pump are required, which makes the system more complicated. Therefore, a technique for securely recovering the adsorbent in a short period of time under a low energy consumption has been desired. If this technique is attained, the dry exhaust gas denitrating device in which the adsorption technique can be utilized using the ammonia adsorbent can be applied to many fields, and the energy saving of the whole apparatus can be expected.

OBJECT AND SUMMARY OF THE INVENTION

In view of the above-mentioned technical level, an object of the present invention is to provide a method for recovering an ammonia adsorbent in response to the above-mentioned technical demand.

The gist of the present invention resides in a method for recovering an ammonia adsorbent which comprises the steps of adsorbing remaining ammonia in an exhaust gas by an ammonia adsorbent layer disposed on the downstream side of a dry exhaust gas denitrating device into which ammonia is injected as a reducing agent, to saturate the adsorbent layer with ammonia, and then introducing and streaming an $NO_x$-containing exhaust gas at 300°–600° C. drawn from an upstream side of the dry exhaust gas denitrating device.

In the present invention, an $NO_x$-containing exhaust gas at 300°–600° C. or an $NO_x$-containing hot air at 300°–600° C. is used as a heat source required for the recovery of the ammonia adsorbent. In the case that the heat source does not include $NO_x$, the desorption of ammonia from the ammonia adsorbent is carried out only by the effect of an elevated temperature, and therefore a long time is taken to achieve desorption and recovery. However, when $NO_x$ is added, $NO_x$ itself reacts rapidly with adsorbed ammonia as shown by the following formula, whereby the ammonia adsorbent can be promptly recovered:

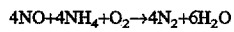

$$4NO+4NH_4+O_2 \rightarrow 4N_2+6H_2O$$

Thus, in the present invention, the removal of ammonia by the reaction of $NO_x$ and ammonia and the desorption of ammonia by the effect of high temperature are simultaneously carried out to remove ammonia promptly and efficiently from the ammonia adsorbent, whereby the ammonia adsorbent can be recovered.

At a temperature of 300° C. or less, the exhaust gas or air containing $NO_x$ does not react with ammonia adsorbed by the ammonia adsorbent, and at a temperature of 600° C. or more, the ammonia adsorbent deteriorates. Therefore, the temperature of the exhaust gas or air containing $NO_x$ should be in the range of from 300° to 600° C.

One example of the ammonia adsorbent which can be used in the present invention is an adsorbent comprising 75% of titania, 5% of vanadium pentoxide and a molding auxiliary agent which will be described in the undermentioned embodiment, and other usable examples of the ammonia adsorbent include alumina, zeolite, silica.alumina, molecular sieve and titania.

In the present invention, a gas released from an ammonia adsorbent layer at the time of the recovery of the ammonia adsorbent is preferably circulated through a position on the upstream side in the exhaust gas flow of the dry exhaust gas denitrating device and on the downstream side of a dividing/drawing portion of the $NO_x$-containing exhaust gas for the recovery.

In the present invention, it is preferable that a plurality of systems of the ammonia adsorbent layers are formed and the adsorption of ammonia and the recovery of the ammonia adsorbent are mutually alternated on each ammonia adsorbent layer.

DETAILED DESCRIPTION OF PREFERRED EMBODIMENTS

Figure 1:
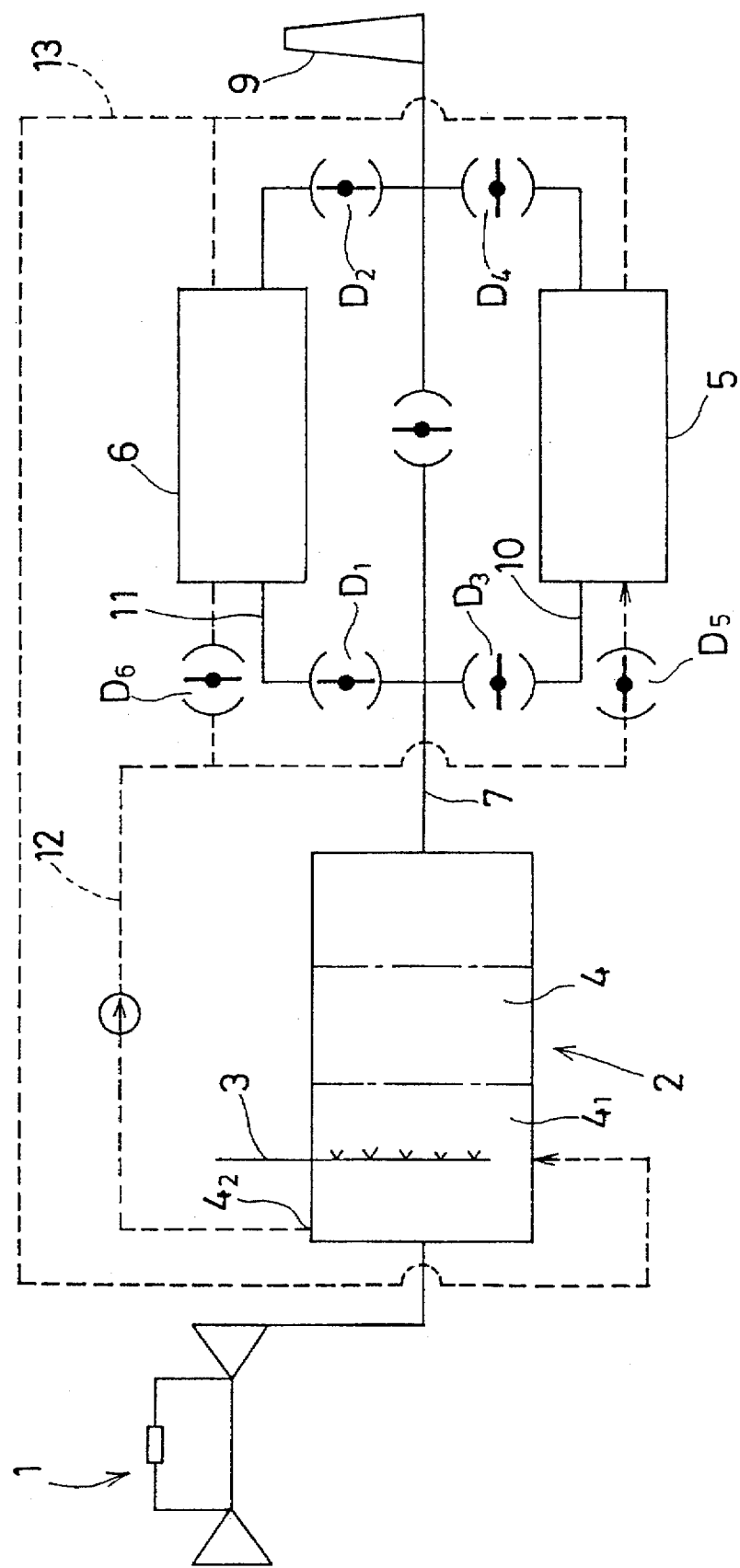
FIG. 1 is a schematic view illustrating an embodiment of a method for recovering an ammonia adsorbent regarding the present invention.

One embodiment of the present invention will be described in reference to, for example, a denitration system of an exhaust gas from a gas turbine 1 equipped with an exhaust gas boiler 2 shown in FIG. 1. This exhaust gas boiler 2 is provided with an ammonia injector 3 and a denitrating device 4 in addition to a heat exchanger (not shown). A gas duct 7 extending from the downstream side of the denitrating device 4 is divided into a duct 10 extending to an ammonia adsorbing tower 5 and a duct 11 extending to another ammonia adsorbing tower 6, and the exhaust gases coming from the ammonia adsorbing towers 5, 6 join into the gas duct 7 again and the joined gas is then discharged into the atmosphere through a chimney 9.

Furthermore, the system of the present invention is provided with an $NO_x$-containing gas duct 12 and a recovery gas duct 13. This $NO_x$-containing gas duct 12 divides and draws the exhaust gas on the upstream side of the ammonia injector 3 of the exhaust gas boiler 2 and then introduces this $NO_x$-containing exhaust gas into the ammonia adsorbing towers 5, 6. On the other hand, the above-mentioned recovery gas duct 13 introduces the recovery gases coming from the ammonia adsorbing towers 5, 6 into a position on the upstream side of the denitrating device 4 of the exhaust gas boiler 2 and on the downstream side of the above-mentioned exhaust gas dividing/drawing position.

The exhaust gas of the thus constituted gas turbine 1 is heat-exchanged in the exhaust gas boiler 2, so that the temperature of the exhaust gas lowers, and ammonia is injected through the ammonia injector 3 and the exhaust gas is then denitrated by the denitrating device 4. However, in the thus treated exhaust gas, ammonia is kept remaining. This exhaust gas containing ammonia is introduced into the ammonia adsorbing tower 6, in which ammonia is adsorbed, and the exhaust gas is introduced into the gas duct 7 again and then discharged through the chimney 9. At this time, dampers $D_1$, $D_2$ of the duct 11 are opened.

On the other hand, dampers $D_3$, $D_4$ of the duct 10 extending to the ammonia adsorbing tower 5 which is another system are closed, but the $NO_x$-containing exhaust gas at a high temperature (300°–600° C.) forwarded through $NO_x$-containing gas duct 12 is introduced into the ammonia adsorbing tower 5 via a damper $D_5$. In this ammonia adsorbing tower 5, ammonia adsorbed by the ammonia adsorbent is desorbed and then returned to an upstream side of the denitrating device 4 of the exhaust gas boiler 2 through the recovery gas duct 13.

The dampers $D_1$ to $D_6$ are switched suitably in accordance with the adsorbing state of ammonia or when a certain time has passed, so that these ammonia adsorbing towers 5, 6 are alternated to adsorb or desorb ammonia.

COMPARATIVE EXAMPLE (Example 1)

An ammonia adsorbent comprising 75% of titania, 5% of vanadium pentoxide and a molding auxiliary agent was molded into pellets having a diameter of 3 mm, and a combustion exhaust gas containing 20 ppm of ammonia at a gas temperature of 100° C. was then introduced into the pellets to adsorb ammonia sufficiently.

Afterward, the feed of the combustion exhaust gas was stopped, and hot air having a gas temperature adjusted to 100° C. was introduced thereinto. At this time, an ammonia concentration change with time at the outlet of the ammonia adsorbent was measured. Furthermore, changes with time at air temperatures of 200° C., 300° C. and 400° C. were measured in the same manner, and the results are shown in Table 1.

TABLE 1

| Gas Temp. (°C.) | Ammonia Concentrations at Outlet of Adsorbent | | | | |
|---|---|---|---|---|---|
| | after 10 min | after 20 min | after 30 min | after 60 min | after 120 min |
| 100 | 2–3 ppm | 2–3 ppm | 2–3 ppm | 2–3 ppm | 2–3 ppm |
| 200 | 3–5 ppm | 5–10 ppm | 5–10 ppm | 5–10 ppm | 5–10 ppm |
| 300 | 60 ppm | 100 ppm | 100 ppm | 50 ppm | 10 ppm |
| 400 | 120 ppm | 180 ppm | 140 ppm | 20 ppm | <1 ppm |

It can be understood from Table 1 that ammonia is rapidly desorbed at a temperature of 300° C. or more. Moreover, the ammonia adsorbents after a passage of 120 minutes were ground and then analyzed to inspect ammonia concentrations, and as a result, it was confirmed that in the cases of 100° C. and 200° C., ammonia remained at high concentrations in the ammonia adsorbents. In the case of 300° C., it was confirmed that a small amount of ammonia remained in the ammonia adsorbent and most of ammonia was desorbed.

EXAMPLE IN ACCORDANCE WITH THE PRESENT INVENTION (Example 2)

The same ammonia adsorbents as in Example 1 were used, and ammonia was adsorbed by the same treatment as in Example 1. Afterward, hot air to which $NO_x$ was added at a concentration of 30 ppm and which was adjusted to 300° C. was introduced, and an ammonia concentration at an outlet was measured. The results are shown in Table 2.

TABLE 2

| Gas Temp. | Ammonia Concentrations at Outlet of Adsorbent | | | | |
|---|---|---|---|---|---|
| | after 10 min | after 20 min | after 30 min | after 60 min | after 120 min |
| 300° C. | 20 ppm | 30 ppm | 10 ppm | <1 ppm | <1 ppm |

It can be understood from Table 2 that in Example 2 regarding the present invention, the ammonia concentration at the outlet lowers more rapidly as compared with Example 1. In addition, the ammonia adsorbents 60 minutes or 120 minutes had passed were ground and then analyzed to inspect ammonia concentrations in the ammonia adsorbents, and as a result, any ammonia was not detected.

In Example 2 described above, the results in the case of using the hot air containing $NO_x$ are exhibited, but also with the use of an exhaust gas containing $NO_x$, about the same results have been obtained.

As is apparent from the foregoing, according to the present invention, an ammonia adsorbent on which ammonia is adsorbed can be rapidly recovered, and in a dry exhaust gas denitration using ammonia as a reducing agent, the present invention can be advantageously applied to a process in which ammonia remaining in a denitrated exhaust gas is desorbed and removed. In addition, when two or more systems having ammonia adsorbing towers are provided and desorption and adsorption are alternated, ammonia in the exhaust gas can be continuously treated.

We claim:

1. A method for recovering an ammonia adsorbent in an exhaust gas denitration system which utilizes ammonia as a reducing agent said method comprising the steps of:

(a) feeding an exhaust gas containing NOx compounds from a gas turbine to an exhaust gas boiler wherein said exhaust gas boiler includes a dry exhaust denitrating device and is located downstream of the gas turbine;

(b) injecting ammonia into said denitrating device to denitrate the NOx-containing exhaust gas in the exhaust gas boiler;

(c) adsorbing the ammonia in the exhaust gas with at least one ammonia adsorbent layer, provided in at least one ammonia adsorbing tower, disposed downstream of the exhaust gas boiler;

(d) saturating said ammonia adsorbent layer with ammonia; and (e) desorbing said saturated ammonia adsorbent layer by introducing and streaming NOx-containing exhaust gas at 300°–600° C. into said ammonia tower, said NOx-containing exhaust gas having been drawn from upstream of the denitrating device.

2. The method for recovering an ammonia adsorbent according to claim 1 further comprising the step of:

circulating a recovery gas released from said ammonia adsorbent layer, at the time of the recovery of the ammonia adsorbent, to a position upstream from said dry exhaust gas denitrating device and downstream from where said $NO_x$ containing gas is drawn.

3. The method for recovering an ammonia adsorbent of claim 1 wherein said exhaust gas denitrating system comprises a plurality of ammonia adsorbent layers.

4. The method for recovering an ammonia adsorbent according to claim 1 wherein said at least one ammonia adsorbent layer comprises a first ammonia adsorbent layer and a second ammonia adsorbent layer wherein each of said layers are capable of adsorbing and desorbing ammonia.

5. The method for recovering an ammonia adsorbent according to claim 4 wherein step (c) takes place in said first ammonia adsorbing layer, while at the same time step (f) takes place in said second ammonia adsorbent layer.

6. The method for recovering an ammonia adsorbent according to claim 5 wherein said first ammonia adsorbent layer receives ammonia containing exhaust gas directly from said dry exhaust gas denitrating device.

7. The method for recovering an ammonia adsorbent according to claim 6 wherein said second ammonia adsorbing layer receives $NO_x$-containing gas drawn directly from said upstream side of said dry exhaust gas denitrating device.

8. The method for recovering an ammonia adsorbent according to claim 1 wherein ammonia is injected into a region upstream of the denitrating device and downstream from where said $NO_x$-containing gas is drawn.

9. The method for recovering an ammonia adsorbent according to claim 1 wherein steps (c) and (f) occur at different temperatures.

* * * * *